UNITED STATES PATENT OFFICE 1,948,814

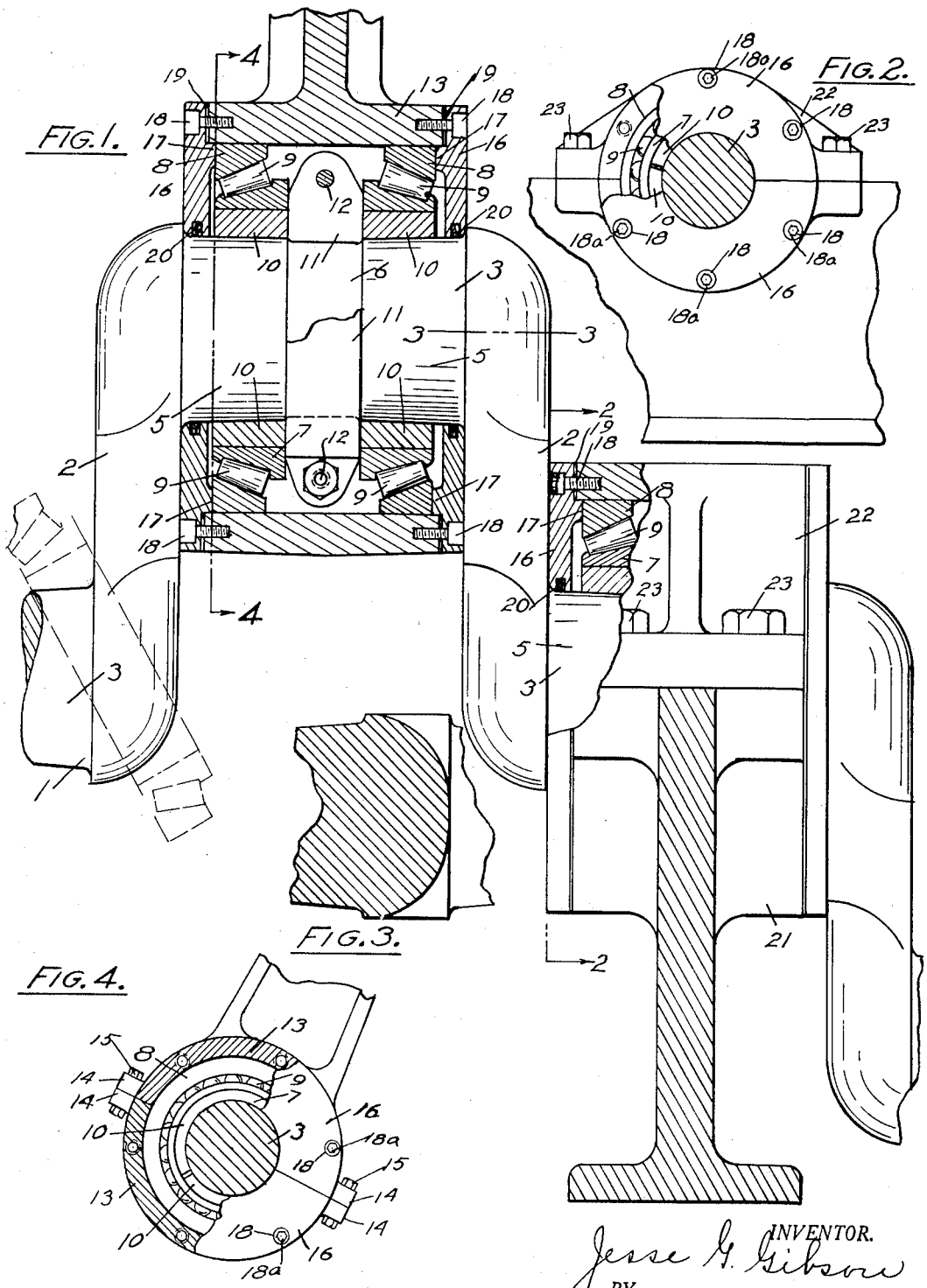

CRANK MECHANISM

Jesse G. Gibson, Bradford, Pa., assignor of fifty-one per cent to Bradford Supply Company, Bradford, Pa., a corporation of Pennsylvania Application October 14, 1932. Serial No. 637,769

11 Claims. (Cl. 308—179)

In many environments it is desirable to supply roller bearings for cranks, but with many crank constructions, such as the double throw cranks, that is, cranks supplied with arms at both sides of the wrist pin, difficulty has been encountered in supplying such a crank with roller bearings of a reasonable size. The present invention is designed to provide in a simple and efficient manner cranks of this type with roller bearings so that such cranks may be more efficient for all purposes, such for example as engine bearings, oil well power apparatus, and where the duty is very severe. In carrying out my invention I provide a roller bearing in which the bearing surfaces are continuous rings so that there is no impairment of the bearing itself in applying it to this use and form the crank of such relative dimensions with relation to the inner ring that the bearing rings may be assembled by passing over the crank ends. Features and details of the invention will appear from the specification and claims.

A preferred embodiment of the invention is illustrated in the accompanying drawing as follows:—

Fig. 1 shows a crank with bearings partly in section thereon.

Fig. 2 a sectional view on the line 2—2 in Fig. 1.

Fig. 3 a section on the line 3—3 in Fig. 1.

Fig. 4 a section on the line 4—4 in Fig. 1.

1 marks the crank shaft. This is shown with a plurality of cranks extending therefrom, each containing crank arms 2 for a double throw crank, the arms being connected to wrist pins 3. These wrist pins have at each end sealing surfaces 5, tapered surfaces 5 and a spacer surface 6. The roller bearing may be of standard shape having an inner ring 7, an outer ring 8, and interposed rollers 9.

The inner ring is of a size permitting the roller bearing to be carried around the crank shaft and past the crank arms that may be necessary to bring the roller bearing to the particular crank, or bearing in the crank shaft on which it is to be placed. The manner of carrying it past the corners is shown in dash lines at the left of Fig. 1. Rings 10 are arranged to fill the radial space between the inner ring 7 and the tapered surface 5. The ring 10 is split and is tapered to conform to the surface 5 and is of a size which permits it to be installed from between the rings, that is to say, the two halves are assembled in the space 6 and moved axially into position so as to fix the inner ring with the wrist pin. After the rings 10 are in place a split spacer ring 11 is placed between them, the halves of this ring being secured together by bolts 12. This spacer ring is made closely to size to properly space the radial spacer rings 10 and to properly place the inner ring 7 of the bearing. An outer annulus 13 surrounds the outer ring 8. It is in the form of a split ring, the parts of which are supplied with ears 14 and clamping bolts 15. This annulus may be the end of a pitman, or connecting rod of an engine, a pull plate of an oil well power, or any similar apparatus using a crank of this type. The annulus 13 is clamped on the outer ring 8. Sealing and clamping plates 16 have projections 17 which engage the outer side edges of the rings 8. The plates 16 are secured by screws 18 which extend through the plates into the annulus 13. These screws are preferably provided with wrench-hold sockets 18a and the heads are arranged in counter-bores in the plates. These plates when they are clamped to position accurately place and hold in adjustment the outer rings 8 of the roller bearing. In order that this may be nicely accomplished, it is usual to provide split ring-shaped shims 19 between the ends of the annulus and the plates so that the roller bearing may be nicely adjusted for its use. The sealing grooves 20 are arranged in the inner peripheries of the plates 16 and these are provided with oil seal felts, or similar material so as to form an oil seal for the bearing.

The same bearing scheme is used for the bearings on the crank shaft where the crank shaft is provided with a plurality of cranks. In this case the bearing 21 with its cap 22 which are clamped together by bolts 23 is simply substituted in the shaft bearings for the annulus 13, the manner of assembly and the construction of the several parts of the bearing being identical.

It will be noted that with this bearing as many cranks may be mounted on the crank shaft as desired and the roller bearings may be assembled along the crank shaft in the manner indicated in dash lines in Fig. 1 so as to locate the bearings not only for the wrist pins, but also for the crank shaft proper along the entire crank shaft. Thus every bearing may be provided with continuous bearing rings of the roller type.

While I have referred to the wrist pins and crank shafts, it will be noted that they are in each instance bearing shafts which connect crank arms so that the manner of assembling the bearings in position is desirable.

While I have shown roller bearing elongated on one axis, it will be understood that any type of anti-friction bearings regardless of the axial dimensions in any direction, such as ball bearings, may be used.

While I have shown a type of roller bearing in which the axis of the roller is elongated I wish to be understood as including in the phrase a "roller bearing" any anti-friction bearing in which there are rotating elements, the rolling of which permits of the rotation of the main bearing without direct frictional action of the opposing surfaces of the stationary and movable parts of the bearing.

What I claim as new is:—

1. In a crank mechanism, the combination of a crank shaft having crank arms connected by a bearing shaft; a roller bearing comprising two pairs of roller bearing rings with interposed rollers, the inner bearing rings being larger than the bearing shaft; and spacer means between the inner rings and the bearing shaft and insertable into position within the rings with endwise displacement within the width of the space between the arms.

2. In a crank mechanism, the combination of a crank shaft having crank arms connected by a bearing shaft; a roller bearing comprising two pairs of roller bearing rings with interposed rollers, the inner bearing rings being larger than the bearing shaft; split spacer rings between the inner rings and the bearing shaft and insertable into position within the rings with endwise displacement within the width of the space between the arms; and axially extending spacer means between the spacer rings.

3. In a crank mechanism, the combination of a crank shaft having arms connected by a bearing shaft, said bearing shaft having tapered surfaces; two pairs of roller bearing rings with interposed rollers on said bearing shaft; wedging radially extending spacing means between the bearing shaft and the inner rings and insertable into position within the rings with endwise displacement within the width of the space between the arms; and axially extending spacer means between the radially extending spacer means.

4. In a crank mechanism, the combination of a crank shaft having arms connected by a bearing shaft, said bearing shaft having tapered surfaces; two pairs of roller bearing rings with interposed rollers on said bearing shaft; wedging radially extending spacing means between the bearing shaft and the inner rings and insertable into position within the rings with endwise displacement within the width of space between the arms; and axially extending spacer means between the radially extending spacer means and the inner rings.

5. In a crank mechanism, the combination of a crank shaft having arms connected by a bearing shaft; a roller bearing comprising two pairs of continuous roller rings with interposed rollers, the inner rings being larger than the bearing shaft; split rings wedged between the inner rings and the bearing shaft and insertable into position within the rings with endwise displacement within the width of the space between the arms; and a spacer means between the split rings.

6. In a crank mechanism, the combination of a crank shaft connected by a bearing shaft; a roller bearing on the bearing shaft comprising two pairs of continuous roller bearing rings with interposed rollers; spacer means between the inner rings of the roller bearings and the bearing shaft and insertable into position within the rings with endwise displacement within the width of the space between the arms; and means securing the outer bearing rings relatively to each other.

7. In a crank mechanism, the combination of a crank shaft connected by a bearing shaft; a roller bearing on the bearing shaft comprising two pairs of continuous roller bearing rings with interposed rollers; spacer means between the inner rings of the roller bearings and the bearing shaft and insertable into position within the rings with endwise displacement within the width of the space between the arms; and means adjustably securing the outer bearing rings relatively to each other.

8. In a crank mechanism, the combination of a crank shaft connected by a bearing shaft; a roller bearing on the bearing shaft comprising two pairs of continuous roller bearing rings with interposed rollers; spacer means between the inner rings of the roller bearings and the bearing shaft, said means being insertable into position in the rings with an endwise displacement approximating the endwise dimension of the bearing; and means securing the outer bearing rings relatively to each other comprising a surrounding annulus and ring plates secured on the annulus and engaging the outer edges of the outer bearing rings.

9. In a crank mechanism, the combination of a crank shaft connected by a bearing shaft; a roller bearing on the bearing shaft comprising two pairs of continuous roller bearing rings with interposed rollers; spacer means between the inner rings of the roller bearings and the bearing shaft, said means being insertable into position in the rings with an endwise displacement approximating the endwise dimension of the bearing; and means securing the outer bearing rings relatively to each other comprising a surrounding annulus, ring plates secured on the annulus and engaging the outer edges of the outer bearing rings, and an oil seal between the plates and the bearing shaft.

10. In a crank bearing, the combination of a bearing shaft; a roller bearing comprising two pairs of roller bearing rings with interposed rollers; radially extending split spacers between the shaft and inner rings of the bearing said spacers being insertable into position in the rings with an endwise displacement approximating the endwise dimension of the bearing; axially extending split spacers between the radially extending spacers; an annulus around the outer rings; and means on the annulus engaging the outer edges of the outer rings.

11. In a crank mechanism, the combination of a crank shaft having arms connected by a bearing shaft, said bearing shaft having opposing tapered surfaces; bearing rings on the bearing shaft comprising two pairs of outer and inner bearing rings with interposed rollers; split radially extending spacer means between the tapered surfaces and the inner bearing rings, said means being insertable into position in the rings with an endwise displacement approximating the endwise dimension of the bearing; split axially extending spacer means between the radially extending spacer means; an annulus around the outer bearing rings; and plates secured to the annulus and engaging the outer bearing rings.

JESSE G. GIBSON.